US010796098B2

(12) United States Patent
Sugiura et al.

(10) Patent No.: US 10,796,098 B2
(45) Date of Patent: Oct. 6, 2020

(54) INSTRUCTION UNDERSTANDING SYSTEM AND INSTRUCTION UNDERSTANDING METHOD

(71) Applicant: NATIONAL INSTITUTE OF INFORMATION AND COMMUNICATIONS TECHNOLOGY, Tokyo (JP)

(72) Inventors: Komei Sugiura, Tokyo (JP); Hisashi Kawai, Tokyo (JP)

(73) Assignee: NATIONAL INSTITUTE OF INFORMATION AND COMMUNICATIONS TECHNOLOGY, Koganei-shi, Tokyo (JP)

( * ) Notice: Subject to any disclaimer, the term of this patent is extended or adjusted under 35 U.S.C. 154(b) by 23 days.

(21) Appl. No.: 16/123,546

(22) Filed: Sep. 6, 2018

(65) Prior Publication Data

US 2019/0079924 A1 Mar. 14, 2019

(30) Foreign Application Priority Data

Sep. 8, 2017 (JP) .................................. 2017-172922

(51) Int. Cl.
*G06F 40/30* (2020.01)
*B25J 9/00* (2006.01)
(Continued)

(52) U.S. Cl.
CPC ............ *G06F 40/30* (2020.01); *B25J 9/0003* (2013.01); *B25J 9/1661* (2013.01); *B25J 9/1697* (2013.01); *B25J 11/008* (2013.01)

(58) Field of Classification Search
USPC .................................................. 704/9, 1–504
See application file for complete search history.

(56) References Cited

U.S. PATENT DOCUMENTS 8,660,849 B2 * 2/2014 Gruber .................. G06F 40/279
704/275
8,670,979 B2 * 3/2014 Gruber .................... G10L 15/26
704/9

(Continued)

OTHER PUBLICATIONS

Komei Sugiura, "Toward Large-Scale Language Learning by Robots Using Real-World Knowledge and Cloud Robotics Platform", Journal of the Society of Instrument and Control Engineers, 2016, pp. 884-889, vol. 55, No. 10.

(Continued)

*Primary Examiner* — Marcus T Riley
(74) *Attorney, Agent, or Firm* — Sughrue Mion, PLLC

(57) ABSTRACT

A new technology of prediction of manipulability in response even to an instruction with missing information in an object manipulation task to have a robot manipulate some kind of object is provided. An instruction understanding system includes an obtaining engine configured to obtain a linguistic expression of a name of an object to be manipulated and a linguistic expression of a situation where the object corresponding to the name is placed in a real environment and a classifier configured to receive input of the linguistic expression of the name and the linguistic expression of the situation and output manipulability of the object corresponding to the name in the real environment.

17 Claims, 12 Drawing Sheets

(51) Int. Cl.
*B25J 9/16* (2006.01)
*B25J 11/00* (2006.01)

(56) References Cited

U.S. PATENT DOCUMENTS

| | | | | |
|---|---|---|---|---|
| 8,731,942 | B2* | 5/2014 | Cheyer | G10L 15/1815 704/275 |
| 8,799,000 | B2* | 8/2014 | Guzzoni | G06F 3/167 704/270.1 |
| 2009/0306825 | A1* | 12/2009 | Li | B25J 9/1669 700/261 |
| 2011/0131033 | A1* | 6/2011 | Ylonen | G06F 40/20 704/9 |
| 2016/0253434 | A1* | 9/2016 | Yu | G06F 16/90332 707/760 |
| 2016/0275075 | A1* | 9/2016 | Yu | G06F 40/47 |
| 2018/0165554 | A1* | 6/2018 | Zhang | G06K 9/6256 |
| 2019/0079924 | A1* | 3/2019 | Sugiura | G06F 40/30 |

OTHER PUBLICATIONS

Quoc Le et al., "Distributed Representations of Sentences and Documents", Proceedings of the 31 st International Conference on Machine Learning, 2014, pp. 1188-1196, Beijing, China.

* cited by examiner

FIG.11A

Trajector: bottle
Situation: insulated water bottle with sipper top. blue and white water bottle. a blue and white water bottle. the water bottle has a blue top. a set of keys by the ⋯

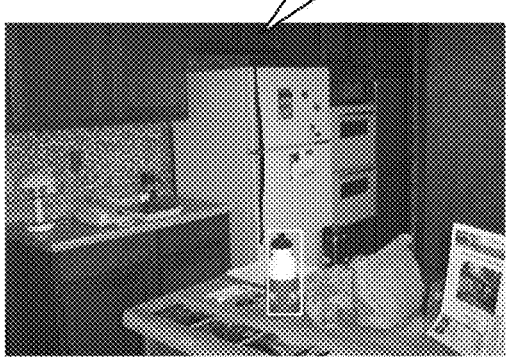

FIG.11B

Trajector: bottle
Situation: a bottle in a woman's hand. plastic bottle of water. bottle of water in woman's hand. water bottle in the hand. a girl holding a bottle. girl under umbrella holding ⋯

INSTRUCTION UNDERSTANDING SYSTEM AND INSTRUCTION UNDERSTANDING METHOD

BACKGROUND OF THE INVENTION

Field of the Invention

The present disclosure relates to language understanding of an instruction sentence including missing information.

Description of the Background Art

A technology of spoken language interaction between a human and a robot has remarkably progressed. In spoken language interaction with such a robot, language processing when given information is missing and language processing relating to symbol grounding represent challenging technical fields that pose many associated problems.

For example, consider such a task that a spoken language instruction to "put away newspaper" in a daily environment is carried out by a robot. There may be a plurality of "newspapers (or objects which can be classified into newspapers)" in a real environment. Furthermore, there are various levels of ambiguity such as "which", "how", and "where" newspaper should be put away. Therefore, an operation desired by a person who issues the instruction is not easily performed. A condition for starting and quitting the task and an action to be taken by the robot in order to address a situation that changes during the course of action which may be natural to the person who issues the instruction cannot often uniquely be determined only from language information in the instruction sentence.

SUMMARY OF THE INVENTION

The present disclosure provides a new technology allowing prediction of manipulability in response even to an instruction including with missing information in an object manipulation task to have a robot manipulate some kind of object.

According to one aspect of the present disclosure, an instruction understanding system for language understanding of an instruction sentence is provided. The instruction understanding system includes an obtaining engine configured to obtain a linguistic expression of a name of an object to be manipulated and a linguistic expression of a situation where the object corresponding to the name is placed in a real environment and a classifier configured to receive input of the linguistic expression of the name and the linguistic expression of the situation and output manipulability of the object corresponding to the name in the real environment. The classifier has been trained using a set of a linguistic expression of a name of an object in an image obtained from each piece of image data included in an image data set, a linguistic expression of a situation about the object, and a label of manipulability.

The classifier may include an extraction network configured to generate a feature sample upon receiving input of the linguistic expression of the name and the linguistic expression of the situation and a discrimination network configured to output, upon receiving input of the feature sample, a first predicted value representing a category of manipulability to which the feature sample is most likely to belong and a second predicted value representing a likelihood of generation of the feature sample by the extraction network. The discrimination network is configured to receive from a generation network configured to generate a pseudo sample upon receiving input of the category and noise, input of the pseudo sample. The discrimination network may have been trained using an object function including a cost function about an error in discrimination as to whether the input sample is the feature sample or the pseudo sample and a cost function about an error in discrimination of the category to which the input sample belongs. The extraction network, the generation network, and the discrimination network may be a learned model as an individual network or as a whole.

Preferably, the extraction network may be configured to output, upon receiving the input of the linguistic expression of the name and the linguistic expression of the situation, a third predicted value representing a category of manipulability to which the input is most likely to belong. An output from a layer including nodes as many as the number of dimensions of the pseudo sample among layers constituting the extraction network may be output as the feature sample.

Preferably, the discrimination network may have been trained using a cost function about an error in discrimination of the category to which the input of the linguistic expression of the name and the linguistic expression of the situation belongs.

Preferably, the instruction understanding system further includes a pre-processing engine configured to convert the linguistic expression of the name and the linguistic expression of the situation into a vector of a fixed length which reflects proximity between words in the linguistic expressions or between whole linguistic expressions.

Preferably, the obtaining engine includes a speech recognition engine configured to recognize a spoken language instruction from a user and to output a linguistic expression of a name of an object to be manipulated and a situation recognition engine configured to output a linguistic expression of a situation where the object to be manipulated is placed based on an image picked up by a camera.

Preferably, the instruction understanding system further includes a command generation engine configured to generate an operation command to a robot based on manipulability of the object to be manipulated from the classifier, in response to the spoken language instruction from the user.

Preferably, the instruction understanding system further includes an interactive screen generation engine configured to generate an interactive screen based on manipulability of each of objects to be manipulated included in an image picked up by a camera.

An instruction understanding method according to one aspect of the present disclosure includes obtaining a linguistic expression of a name of an object to be manipulated and a linguistic expression of a situation where the object corresponding to the name is placed in a real environment and inputting the linguistic expression of the name and the linguistic expression of the situation into a classifier and outputting manipulability of the object corresponding to the name in the real environment. The classifier has been trained using a set of a linguistic expression of a name of an object in an image obtained from each piece of image data included in an image data set, a linguistic expression of a situation about the object, and a label of manipulability.

Preferably, the classifier includes an extraction network configured to generate a feature sample upon receiving input of the linguistic expression of the name and the linguistic expression of the situation and a discrimination network configured to output, upon receiving input of the feature sample, a first predicted value representing a category of manipulability to which the feature sample is most likely to belong and a second predicted value representing a likelihood of generation of the feature sample by the extraction network. The discrimination network is configured to receive from a generation network configured to generate a pseudo sample upon receiving input of the category and noise, input of the pseudo sample. The method further includes training the discrimination network by using an object function including a cost function about an error in discrimination of the category to which the input sample belongs and a cost function about an error in discrimination as to whether the input sample is the feature sample or the pseudo sample.

Preferably, the extraction network is configured to output, upon receiving the input of the linguistic expression of the name and the linguistic expression of the situation, a third predicted value representing a category of manipulability to which the input is most likely to belong. The method further includes training the discrimination network by using a cost function about an error in discrimination of the category to which the input of the linguistic expression of the name and the linguistic expression of the situation belongs.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 11A and 11B are diagrams showing examples of a constructed data set.

DESCRIPTION OF THE PREFERRED EMBODIMENTS

Figure 1:
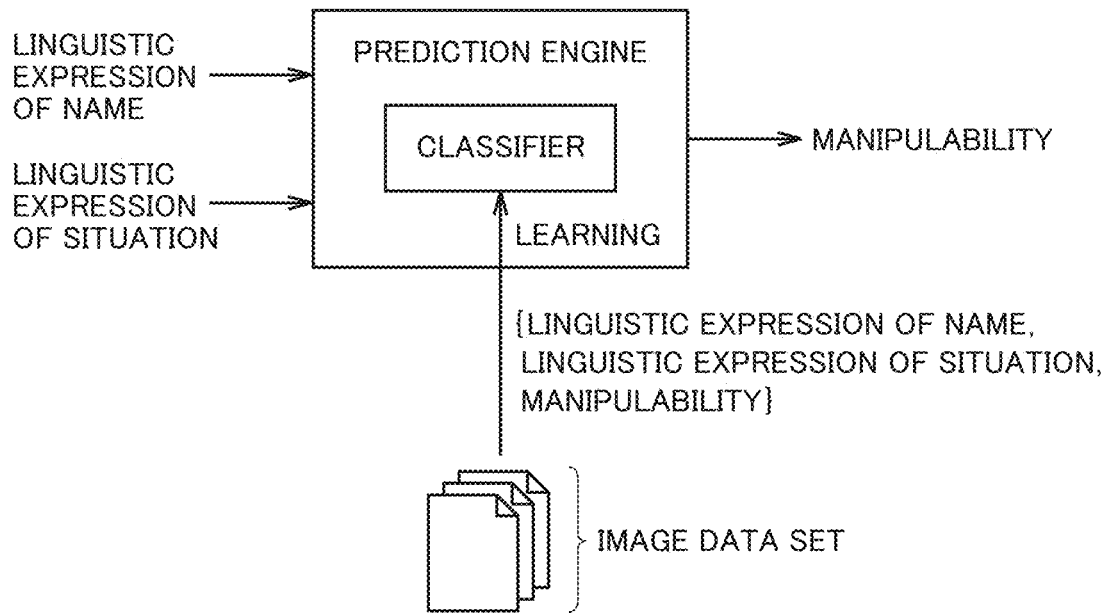
FIG. 1 is a schematic diagram showing overview of a prediction engine according to the present embodiment.

An embodiment of the present disclosure will be described in detail with reference to the drawings. The same or corresponding elements in the drawings have the same reference characters allotted and description thereof will not be repeated.

A. Overview

The present embodiment provides an instruction understanding system for language understanding of an instruction sentence. More specifically, the present embodiment obtains in connection with some kind of object of interest, a "name" which is a language expression of what the object is and a "situation" which is a language expression of how a situation around the object of interest is. The obtained "name" and "situation" are both linguistic expressions or linguistic contexts. The present embodiment is directed to processing for estimating or obtaining manipulability of the object of interest based on the obtained "name" and "situation". Whether or not the object of interest is really manipulable is determined based on estimated or obtained manipulability.

"Manipulation" herein can be any manipulation of an object. By way of example, an operation to "hold", "pick up," "store", "place", and "move" an object is assumed. The present disclosure can address any manipulation of an object without being limited to those listed operations.

One aspect of the present disclosure is directed to a computation function or computation processing for estimating manipulability of an object as described above. The computation function for estimating such manipulability is also abbreviated as a "prediction engine" in the description below.

FIG. 1 is a schematic diagram showing overview of a prediction engine according to the present embodiment. Referring to FIG. 1, the prediction engine obtains a linguistic expression of a name of an object to be manipulated and a linguistic expression of a situation where the object corresponding to the name is placed in a real environment. For obtaining a linguistic expression of a name and a linguistic expression of a situation, not only an automatic method with some kind of algorithm but also audio input or text input by a human is also applicable.

The prediction engine includes a classifier configured to receive input of a linguistic expression of a name and a linguistic expression of a situation and to output manipulability of an object corresponding to the name in a real environment. The classifier has been trained using a set of a linguistic expression of a name of an object in an image obtained from each piece of image data included in an image data set, a linguistic expression of a situation about the object, and a label of manipulability.

By making use of such a prediction engine, in an object manipulation task to have a robot manipulate some kind of object, an appropriate operation command can be given to the robot even though an instruction with missing information is given.

B. Application Example

Figure 2:
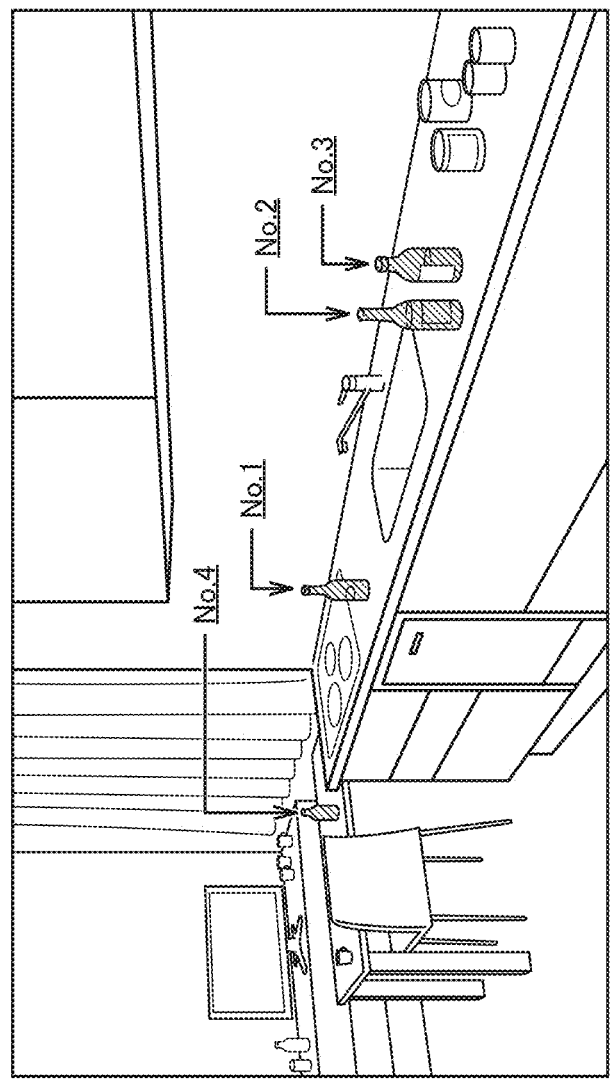
FIG. 2 is a schematic diagram showing one example of a user interface screen provided by an object manipulation system with the use of the prediction engine according to the present embodiment.

A system including the prediction engine will initially be described as an application example of the instruction understanding system according to the present embodiment. FIG. 2 is a schematic diagram showing one example of a user interface screen provided by an object manipulation system 1 with the use of the prediction engine according to the present embodiment.

The user interface screen shown in FIG. 2 assumes an example in which a user has issued a spoken language instruction "Bottle, please." In response to such a spoken language instruction, the prediction engine according to the present embodiment obtains a linguistic expression of a name of an object included in the spoken language instruction (that is, "bottle") and a linguistic expression of a situation about the designated object obtained from an image picked up by a camera or the like, and estimates manipulability of the object having the designated name.

When there are a plurality of objects having the designated name within a field of view of the camera, manipulability is estimated for each object. As shown in FIG. 2, manipulable objects are shown each with a caption being given thereto. When a plurality of captions are shown, for example, information for specifying each caption is also shown.

When a subsequent spoken language instruction (for example, "No. 1, please") is issued from the user in such a state, in response to the spoken language instruction, a domestic service robot manipulates the object provided with the specific caption.

By providing such a spoken language interaction environment, for example, support for a physically disabled user's life can be provided.

C. System Configuration Example

One example of a system including the prediction engine according to the present embodiment will now be described.

Figure 3:
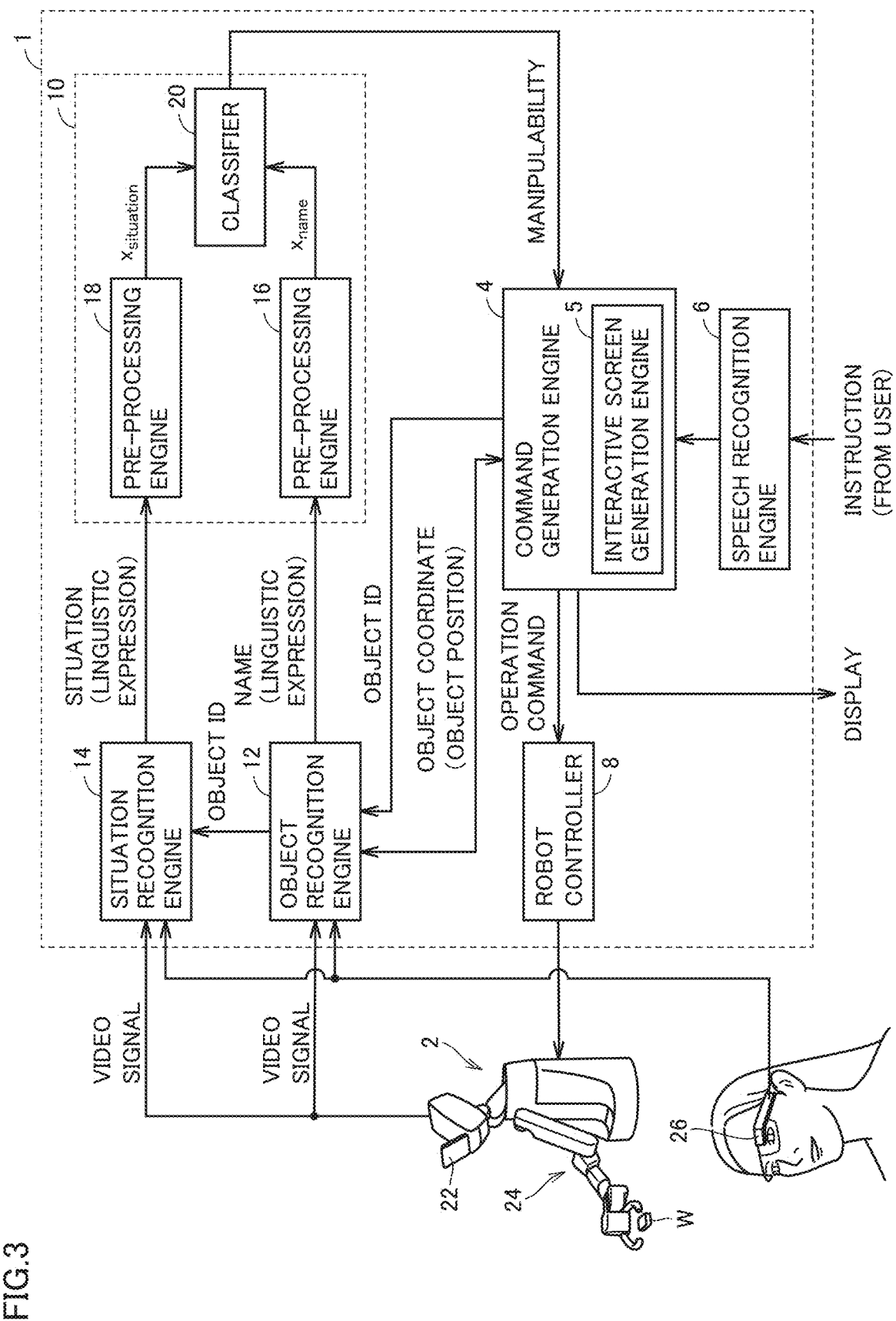
FIG. 3 is a schematic diagram showing a configuration example of the object manipulation system including the prediction engine according to the present embodiment.

FIG. 3 is a schematic diagram showing a configuration example of object manipulation system 1 including the prediction engine according to the present embodiment. Referring to FIG. 3, object manipulation system 1 according to the present embodiment estimates manipulability of any object of interest upon receiving an instruction from a user and gives an operation command in accordance with the instruction from the user to a robot 2 based on a prediction result.

More specifically, object manipulation system 1 includes robot 2, a command generation engine 4, a speech recognition engine 6, a robot controller 8, a prediction engine 10, an object recognition engine 12, and a situation recognition engine 14. Prediction engine 10 includes pre-processing engines 16 and 18 and a classifier 20.

Any robot which can manipulate an object in some way is applicable as robot 2. Any apparatus or mechanism which can manipulate an object in some way can be employed as an "actuator" without being restricted by the designation "robot". In the configuration shown in FIG. 3, robot 2 includes a camera 22 configured to pick up an image of an object and a manipulator 24 which applies a physical action to the object in accordance with an operation command. FIG. 3 shows an example in which camera 22 and manipulator 24 are mounted as one robot 2. These functions may be provided separately. Alternatively, a plurality of cameras 22 may be arranged. Alternatively, a camera 26 incorporated in a wearable device worn by a user may be used.

Command generation engine 4 generates an operation command to robot 2 based on manipulability of an object to be manipulated from classifier 20, in accordance with a spoken language instruction from a user. More specifically, when command generation engine 4 receives a speech or text instruction from a user, it gives object recognition engine 12 identification information (an object ID) for specifying a type of an object included in the instruction from the user. Command generation engine 4 receives an object coordinate (an object position) of the object corresponding to the object ID, and generates an operation command for having robot 2 manipulate any object based on information on manipulability from prediction engine 10.

Command generation engine 4 may include an interactive screen generation engine 5. Interactive screen generation engine 5 generates an interactive screen based on manipulability of each object to be manipulated which is included in an image picked up by the camera. By way of example, interactive screen generation engine 5 generates and provides a user interface screen through which it can interact with the user as shown in FIG. 2 described above.

Speech recognition engine 6 outputs contents of the instruction through speech recognition to command generation engine 4, upon receiving the spoken language instruction from the user. In particular, speech recognition engine 6 recognizes a spoken language instruction from the user and outputs a linguistic expression of a name of an object to be manipulated.

Object recognition engine 12 recognizes (or discriminates) an object of a type corresponding to the object ID included in the field of view of the camera based on a video signal from the camera and in accordance with the object ID from command generation engine 4. Object recognition engine 12 outputs an object coordinate of the recognized object to command generation engine 4 and outputs the object ID from command generation engine 4 to situation recognition engine 14. Object recognition engine 12 outputs the name of the recognized object to prediction engine 10 as a linguistic expression (language context) which is a natural language that can be understood by humans.

Situation recognition engine 14 outputs a linguistic expression of a situation where an object to be manipulated is placed based on an image picked up by the camera. More specifically, situation recognition engine 14 recognizes a situation where an object of a type corresponding to an object ID included in the field of view of the camera is placed based on a video signal from the camera and in accordance with an object ID from object recognition engine 12, and outputs the recognized situation. In the present embodiment, situation recognition engine 14 outputs the recognized situation as a linguistic expression which is a natural language that can be understood by humans. The output linguistic expression corresponds to description of the object of interest and the situation including the surroundings of the object.

In object manipulation system 1 according to the present embodiment, information on a type of an object and a situation where the object is placed is output in a format the same as the natural language uttered by humans as they visually recognize an object. Therefore, instead of providing object recognition engine 12 and/or situation recognition engine 14, natural language (speech or text) uttered or described as a result of visual recognition of an object of interest by a real user can also be input as it is.

Pre-processing engines 16 and 18 each generate an input vector having a prescribed number of dimensions to be given to classifier 20. Pre-processing engines 16 and 18 convert a linguistic expression of a name and a linguistic expression of a situation into vectors having fixed lengths, respectively.

Classifier 20 includes a discriminator configured through supervised learning. Classifier 20 is given as input, a real sample $x_{name}$ having a prescribed number of dimensions obtained by conversion of a linguistic expression of a name from object recognition engine 12 by pre-processing engine 16 and a real sample $x_{situation}$ having a prescribed number of dimensions obtained by conversion of a linguistic expression of a situation from situation recognition engine 14 by pre-processing engine 18. Classifier 20 outputs information representing manipulability of an object upon receiving real sample $x_{name}$ and real sample $x_{situation}$.

"Manipulability of an object" herein means an indicator representing a likelihood that an object of interest can be manipulated in some way. The output indicator may be a numeric value representing a likelihood (for example, 0 to 100%) or may indicate any of a plurality of categories. For example, when manipulation to hold an object of interest is assumed, any of four categories of "unable to hold," "unmanipulable", "difficult to manipulate," and "easy to manipulate" is applicable as a form of output of manipulability of an object.

Object recognition engine 12 can also output a coordinate of a recognized object (that is, a position of an object). When robot controller 8 determines that an object of interest is manipulable based on manipulability of an object from prediction engine 10, it generates an operation command based on the object coordinate from object recognition engine 12 in response to an instruction from a user and gives the operation command to robot 2. Robot 2 manipulates the object of interest in response to the operation command from robot controller 8.

By adopting object manipulation system 1 as described above, for example, robot 2 can be used to support a physically disabled user's life.

D. Functional Configuration of Object Manipulation System 1

One example of a functional configuration of object manipulation system 1 according to the present embodiment will now be described.

(d1: Object Recognition Engine 12)

Object recognition engine 12 with which prediction engine 10 of object manipulation system 1 is configured detects any object included in a field of view of the camera based on a video signal from the camera and outputs a position and a type thereof. Such object recognition engine 12 can be implemented by using a known technique for detecting an object in an image and giving a name representing a type of the detected object.

For example, by adopting a classifier which has been trained by a plurality of images in which a type of an object is defined as a category with the use of a region-based convolutional neural network (R-CNN), an object included as a subject in an input video signal can be detected and a likelihood that the detected object belongs to each category can be estimated.

For example, when three categories have been trained, a likelihood that the detected object belongs to each category can be expressed with a vector of a three-dimensional (0, 1) expression. For example, when a likelihood that an object belongs to a category 1 is "0.70", a likelihood that the object belongs to a category 2 is "0.05," and a likelihood that the object belongs to a category 3 is "0.10", the detected object can be determined as belonging to "category 1," which can be expressed as (1, 0, 0) as a vector in the three-dimensional (0, 1) expression. A name in accordance with a category to which each object has been determined to belong can also be given as a caption.

Since processing with the R-CNN as described above has been known, description in further detail will not be given.

Figure 4:
FIG. 4 is a diagram of one visualized example of a result of recognition of an object by an object recognition engine according to the present embodiment.

FIG. 4 is a diagram of one visualized example of a result of recognition of an object by the object recognition engine according to the present embodiment. It can be seen in FIG. 4 that each of a plurality of objects arranged on a table is detected and a caption indicating a type of each detected object is given.

(d2: Situation Recognition Engine 14)

Situation recognition engine 14 with which prediction engine 10 of object manipulation system 1 is configured outputs information representing a situation where a specific object is placed based on a video signal from the camera. Prediction engine 10 can be implemented, for example, by a faster recurrent convolutional neural network (Faster-RCNN). In this case, a network can be trained, for example, by using as a training sample, a data set in which an image and a linguistic expression representing a situation where a specific object is placed in the image are associated with each other.

In such training of the network, a "Visual Genome" data set as will be described later can also be used.

(d3: Pre-Processing Engines 16 and 18)

Pre-processing engines 16 and 18 each generate a sample (vector) to be input to classifier 20. In order to simplify processing by classifier 20, pre-processing engines 16 and 18 convert a name and a situation that are input into vectors of fixed lengths, respectively.

In the present embodiment, for distinction based on a linguistic meaning of a name and a situation input to classifier 20, a vector which reflects proximity between words which appear in an input linguistic expression is input to classifier 20. Pre-processing engines 16 and 18 each generate a vector of a fixed length in accordance with an algorithm which reflects proximity between words which appear in an input linguistic expression. Such a vector having a fixed length is referred to as a "paragraph vector." Thus, pre-processing engines 16 and 18 convert a linguistic expression of a name and a linguistic expression of a situation that are input into vectors of fixed lengths (paragraph vectors) which reflect proximity between words in the linguistic expressions or between whole linguistic expressions, respectively.

Though an expression "paragraph vector" is used in the description below, this denotation is not limitative but is a term which may comprehensively encompass vectors having the same technical concept as being derived from the entire disclosure herein.

More specifically, pre-processing engines 16 and 18 express each of words included in an input language as a word vector and output a paragraph vector in consideration of proximity between word vectors. Such conversion into a paragraph vector can be achieved by using a trained neural network.

A technique referred to as distributed memory model of paragraph vectors (PV-DM) can be adopted for generation of such a paragraph vector (see Q. Le and T. Mikolov, "Distributed Representations of Sentences and Documents," Proc. of ICML, pp. 1188-1196, 2014).

Thus, pre-processing engine 16 outputs real sample $x_{name}$ for a name and pre-processing engine 18 outputs real sample $x_{situation}$ for a situation. Real sample $x_{name}$ and real sample $x_{situation}$ are each a vector having a prescribed number of dimensions.

(d4: Classifier 20)

Classifier 20 with which prediction engine 10 of object manipulation system 1 is configured outputs manipulability of an object, with a name of an object output from object recognition engine 12 (in an implementation, real sample $x_{name}$ for the name) and a situation output from situation recognition engine 14 (in an implementation, real sample $x_{situation}$ for the situation) being received as inputs. Any feature configured through supervised learning can be adopted as classifier 20. For example, a support vector machine (SVM) or any neural network can be adopted as such classifier 20.

In prediction engine 10 of object manipulation system 1 according to the present embodiment, by way of example, a neural network which is improvement of a model referred to as generative adversarial nets (GAN) is adopted. GAN is a method of training a generation model for generating a sample with the use of a two-person zero-sum game derived from a game theory. GAN is basically constituted of two neural networks. One neural network is a discriminator which classifies an image as real or fake, and the other neural network is a generator which generates an image which "fakes" the discriminator.

Conditional GAN (which is also abbreviated as "cGAN" below) which uses conditional information for instructing a generator (a generation network) to perform a data generation process has been proposed as one example of such GAN.

Classifier 20 according to the present embodiment includes a framework based on supervised cGAN.

Figure 5:
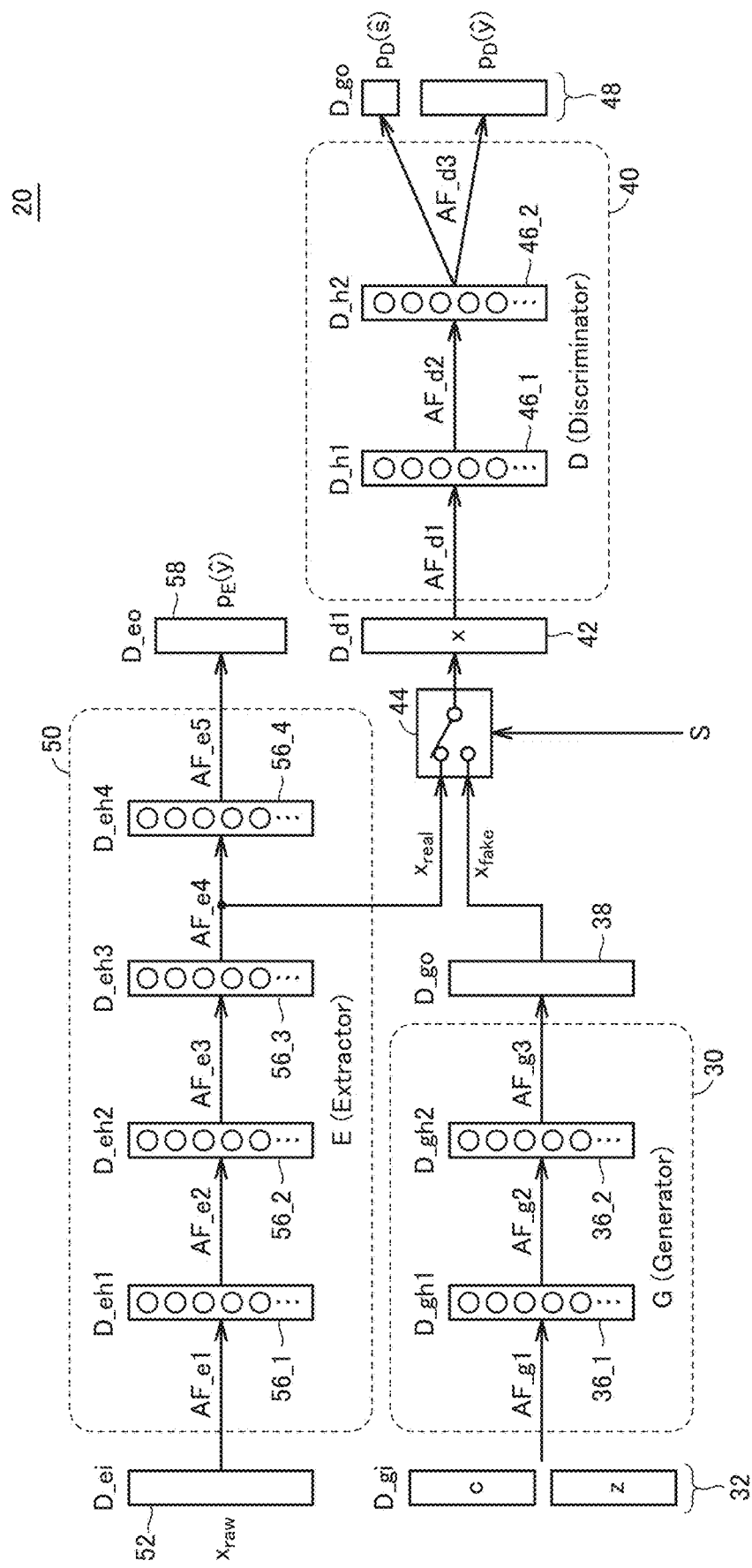
FIG. 5 is a schematic diagram showing one example of a network configuration of a classifier according to the present embodiment.

FIG. 5 is a schematic diagram showing one example of a network configuration of classifier 20 according to the present embodiment. Referring to FIG. 5, classifier 20 includes a generation network 30 corresponding to the generator and a discrimination network 40 corresponding to the discriminator. Classifier 20 further includes an extraction network 50. Any neural network can be adopted for generation network 30, discrimination network 40, and extraction network 50, and any number of layers therein can be designed. For example, multilayer perceptron or convolutional neural network (CNN) can be adopted.

Classifier 20 is a learned model which has been trained using a training sample as will be described later. In the description below, a stage in which processing for constructing classifier 20 is performed is referred to as a "learning phase" and a stage in which a classification task with the use of classifier 20 (more specifically, an object manipulation task) is performed is also referred to as a "predicted phase."

In the learning phase, generation network 30, discrimination network 40, and extraction network 50 have been trained using a training sample. A procedure of training of each neural network in the learning phase will be described later.

In the predicted phase, basically, a classification task is performed by using extraction network 50 and discrimination network 40.

Generation network 30 is a learned model which generates a pseudo sample upon receiving input of a category and noise. More specifically, generation network 30 generates a pseudo sample from a category c (identical to a category y) and noise z. The generated pseudo sample is also denoted as "$x_{fake}$".

Extraction network 50 is a learned model which generates a feature sample upon receiving input of a linguistic expression of a name and a linguistic expression of a situation. More specifically, extraction network 50 generates a feature sample from an input sample $x_{raw}$ composed of real sample $x_{name}$ for a name and real sample $x_{situation}$ for a situation. The generated feature sample is also denoted as "$x_{real}$".

Discrimination network 40 is a learned model which outputs, upon receiving input of the feature sample, a predicted value $p_D(\hat{y})$ (a first predicted value) indicating a category of manipulability to which the feature sample is most likely to belong and a predicted value $p_D(\hat{S})$ (a second predicted value) representing a likelihood that the feature sample is generated by extraction network 50. A pseudo sample can be input to discrimination network 40.

More specifically, in the learning phase, discrimination network 40 outputs, upon receiving input of feature sample $x_{real}$ from extraction network 50 and pseudo sample $x_{fake}$ from generation network 30, predicted value $p_D(\hat{y})$ indicating a category to which the input sample is most likely to belong and predicted value $p_D(\hat{S})$ indicating a likelihood that an input source S is "real".

Generation network 30, discrimination network 40, and extraction network 50 as a whole thus correspond to the learned model.

In the predicted phase, discrimination network 40 outputs, upon receiving input of feature sample $x_{real}$ from extraction network 50, predicted value $p_D(\hat{y})$ indicating a category to which the input sample is most likely to belong and predicted value $p_D(\hat{S})$ indicating a likelihood that input source S is "real". In the predicted phase, basically, only predicted value $p_D(\hat{y})$ is used.

Upon receiving input of a linguistic expression of a name and a linguistic expression of a situation, extraction network 50 outputs a predicted value $p_E(\hat{y})$ (a third predicted value) indicating a category of manipulability to which the input is most likely to belong.

A detailed configuration of each neural network will be described below.

Generation network 30 includes one layer or a plurality of layers 36_1, 36_2, . . . (layers are also collectively referred to as a "layer 36" below), input is given from an input layer 32 to a first layer 36_1, and a result from generation network 30 is output to an output layer 38. FIG. 5 shows generation network 30 constituted of two layers 36 by way of example. Category c and noise z are given to input layer 32 in the learning phase.

Discrimination network 40 includes one layer or a plurality of layers 46_1, 46_2, . . . (layers are also collectively referred to as a "layer 46" below), input is given from an input layer 42 to a first layer 46_1, and a result from discrimination network 40 is output to an output layer 48. FIG. 5 shows discrimination network 40 constituted of two layers 46 by way of example.

Extraction network 50 includes one layer or a plurality of layers 56_1, 56_2, . . . (layers are also collectively referred to as a "layer 56" below), input is given from an input layer 52 to a first layer 56_1, and a result from extraction network 50 is output to an output layer 58. FIG. 5 shows extraction network 50 constituted of four layers 56 by way of example.

In the present embodiment, a vector representing manipulability (that is, correct answer data) is used as category c. When manipulability in four categories is adopted, four-dimensional category c corresponding to each category can be employed. For example, in indicating a first category, an expression category c=(1, 0, 0, 0) can be given. Similarly, in indicating a second category, an expression category c=(0, 1, 0, 0) can be given.

For example, a random vector generated from a standard normal distribution (Gaussian distribution) source or alternatively a random vector generated from any noise source other than the former may be employed as noise z. In the present embodiment, a one-hundred dimensional vector is adopted as noise z.

When category c is a four-dimensional vector and noise z is a one-hundred dimensional vector, a one-hundred-and-four dimensional vector resulting from combination of these vectors is given to input layer 32.

Any number and configuration can be adopted for the number of nodes in each of layers 36 constituting generation network 30 and an activation function between layers. A sigmoid function (tan h), a rectified linear unit (ReLU) representing a ramp function and a derivative thereof (for example, leaky ReLU), and a softmax function can be employed as one exemplary activation function. In generation network 30, for example, ReLU is adopted for combination between input layer 32 and layer 36_1 and combination between layer 36_1 and layer 36_2. Since an output from generation network 30 has a real number value which takes positive and negative values, the sigmoid function is adopted for layer 36_2 which is the final layer. By way of example, layer 36_1 and layer 36_2 each include one hundred nodes and output layer 38 includes fifty nodes.

A vector given from generation network 30 to output layer 38 is $x_{fake}$.

Then, in discrimination network 40, input is given from input layer 42 to first layer 46_1 and a result from discrimination network 40 is output to output layer 48.

Feature sample $x_{real}$ or pseudo sample $x_{fake}$ is selectively input to input layer 42 of discrimination network 40 by a selector 44. Training samples are often shuffled in advance, and selection is made depending on whether the training sample at that time is feature sample $x_{real}$ or pseudo sample $x_{fake}$.

Any number and configuration can be adopted for the number of nodes in each of layers 46 constituting discrimination network 40 and an activation function between layers. In discrimination network 40, for example, ReLU is adopted for combination between input layer 42 and layer 46_1 and combination between layer 46_1 and layer 46_2. By way of example, layer 46_1 and layer 46_2 each include one hundred nodes. Since an output from discrimination network 40 is a categorical variable, the softmax function is adopted for layer 46_2 which is the final layer.

In extraction network 50, input is given from input layer 52 to first layer 56_1 and a result from extraction network 50 is output to output layer 58.

Input sample $x_{raw}$ is input to input layer 52 of extraction network 50. Input sample $x_{raw}$ corresponds to a vector resulting from combination between real sample $x_{name}$ and real sample $x_{situation}$. For example, when real sample $x_{name}$ and real sample $x_{situation}$ are each a two-hundred dimensional vector, input sample $x_{raw}$ is a four-hundred dimensional vector.

Any number and configuration can be adopted for the number of nodes in each of layers 56 constituting extraction network 50 and an activation function between layers. In extraction network 50, for example, ReLU is adopted for combination between layer 56_1 and layer 56_2, combination between layer 56_2 and layer 56_3, and combination between layer 56_3 and layer 56_4. Pre-activation is applied for combination between input layer 52 and layer 56_1. Since an output from extraction network 50 is a categorical variable, the softmax function is adopted for layer 56_4 which is the final layer.

By way of example, layer 56_1 includes four hundred nodes, each of layers 56_2 and 56_4 includes one hundred nodes, and layer 56_3 includes fifty nodes.

Predicted value $p_E(\hat{y})$ indicating a category of manipulability to which input input sample $x_{raw}$ is most likely to belong is output to output layer 58 from extraction network 50. In the present embodiment, a vector given to a layer in extraction network 50 (layer 56_3) is output as feature sample $x_{real}$. Feature sample $x_{real}$ is equal in number of dimensions to pseudo sample $x_{fake}$.

A designer can arbitrarily select a layer from which feature sample $x_{real}$ is to be extracted in extraction network 50 in consideration of the entire extraction network 50. Layer 56_3 which outputs feature sample $x_{real}$ in the present embodiment is the smallest in number of nodes among layers constituting extraction network 50.

Thus, extraction network 50 extracts a feature included in input sample $x_{raw}$ and inputs a sample which reflects the extracted feature to a framework based on supervised cGAN consisting of generation network 30 and discrimination network 40. Namely, extraction network 50 is a neural network which generates a pseudo feature value associated with classification. By adopting extraction network 50, necessary performance is realized with a smaller number of times of learning and processing can be simplified.

The network configuration shown in FIG. 5 may also be referred to as "latent classifier generative adversarial nets (LAC-GAN)" below.

E. Learning Procedure (Learning Phase)

Contents in a learning procedure for training classifier 20 will now be described. As shown in FIG. 5, classifier 20 according to the present embodiment consists of three neural networks. One example of the procedure for training the three neural networks will be described.

A training sample is given as a set ($x_{raw}$; y). Input sample $x_{raw}$ ($R^N \ni x_{raw}$) represents a feature value before extraction by extraction network 50 and y represents a category of corresponding manipulability. Category y is a (0, 1) expression the same in dimension as category c.

A purpose of extraction network 50 is to extract from input input sample $x_{raw}$, $x_{real}$ representing a feature value suitable for classification. Since classifier 20 is configured with GAN (generation network 30 and discrimination network 40) in the present embodiment, use of $x_{real}$ representing a feature value suitable for classification is more advantageous in terms of performance than use of input sample $x_{raw}$ as it is.

Training of extraction network 50 aims at classification of a category to which input input sample $x_{raw}$ belongs without making an error as much as possible. Namely, training of extraction network 50 aims to minimize cross entropy $J_{CE}$ shown in an expression (1) below:

$$J_{CE} = -\sum_j y_j \log p_E(\hat{y}_j) \qquad (1)$$

where $y_j$ is a (0, 1) expression the same in dimension as category y and $p_E(\hat{y}_j)$ represents a value in the output layer of extraction network 50. Extraction network 50 is a bottleneck network, and an output from a layer having the number of nodes equal to the number of dimensions of pseudo sample $x_{fake}$ among layers constituting extraction network 50 is output as feature sample $x_{real}$.

In GAN (generation network 30 and discrimination network 40), category c and noise z are input to generation network 30. Category c is generated from a categorical distribution and noise z is sampled from any distribution (a standard normal distribution (Gaussian distribution) or other uniform distributions)). Category c is a four-dimensional vector which represents the number of categories corresponding to manipulability in the present embodiment, and noise z is a $d_z$-dimensional random number. $d_z$ represents the number of dimensions of z, and can arbitrarily be set by a designer, for example, around one-hundred dimensions. Pseudo sample $x_{fake}$ is output from generation network 30.

Input to discrimination network 40 is similar to that in normal GAN, and selector 44 selects input source S={real, fake}. Depending on selection of input source S, $x_{real}$ and $x_{fake}$ are input as a sample. Predicted value $p_D(S)$ of a likelihood that input source S is "real" and predicted value $p_D(\hat{y})$ of a category to which the input sample belongs are output from discrimination network 40. Namely, discrimination network 40 outputs in response to input sample x, a predicted value of a likelihood shown in an expression (2) below.

$$D(x)=p(S=\text{real}|x) \quad (2)$$

Training of discrimination network 40 aims not to mix up input feature sample $x_{real}$ and pseudo sample $x_{fake}$ but to classify a category to which input feature sample $x_{real}$ or pseudo sample $x_{fake}$ belongs without making an error as much as possible. Namely, a cost function $J_S$ for predicted value $p_D(\hat{S})$ and a cost function $J_{DC}$ for predicted value $p_D(\hat{y})$ can be shown in an expression (3) and an expression (4) below, respectively.

$$J_S = -\frac{1}{2}E_{x_{real}}\log D(x_{real}) - \frac{1}{2}E_{z,c}\log(1 - D(G(z,c))) \quad (3)$$

$$J_{DC} = -\sum_j y_j \log p_D(y_j) \quad (4)$$

G(z, c) in the expression (3) means pseudo sample $x_{fake}$ output from generation network 30 upon receiving input of category c and noise z.

Training of generation network 30 aims to improve a likelihood of mix-up by discrimination network 40 of generated pseudo sample $x_{fake}$ as feature sample $x_{real}$. Namely, generation network 30 is trained in order to fake discrimination network 40 to have it incorrectly determine pseudo sample $x_{fake}$ output from generation network 30 as "real". Therefore, the cost function of generation network 30 corresponds to a negative value of cost function $J_S$ for predicted value $p_D(\hat{S})$ of discrimination network 40.

Therefore, cost functions $J^{(E)}$, $J^{(D)}$, and $J^{(G)}$ for extraction network 50, discrimination network 40, and generation network 30 can be shown in expressions (5) to (7) below, respectively.

$$J^{(E)} = J_{CE} \quad (5)$$

$$J^{(D)} = J_S + \lambda J_{DC} \quad (6)$$

$$J^{(G)} = -J_S \quad (7)$$

λ in the expression (6) represents a tradeoff coefficient between the object functions shown in the expression (3) and the expression (4).

Extraction network 50 is thus trained using the cost functions about an error in discrimination of a category to which input of a linguistic expression of a name and a linguistic expression of a situation belongs. Discrimination network 40 is trained using an object function including cost function $J_S$ about an error in discrimination as to whether input sample x is a feature sample or a pseudo sample and cost function $J_S$ about an error in discrimination of a category to which input sample x belongs.

F. Processing Procedure in Learning Procedure

Figure 6:
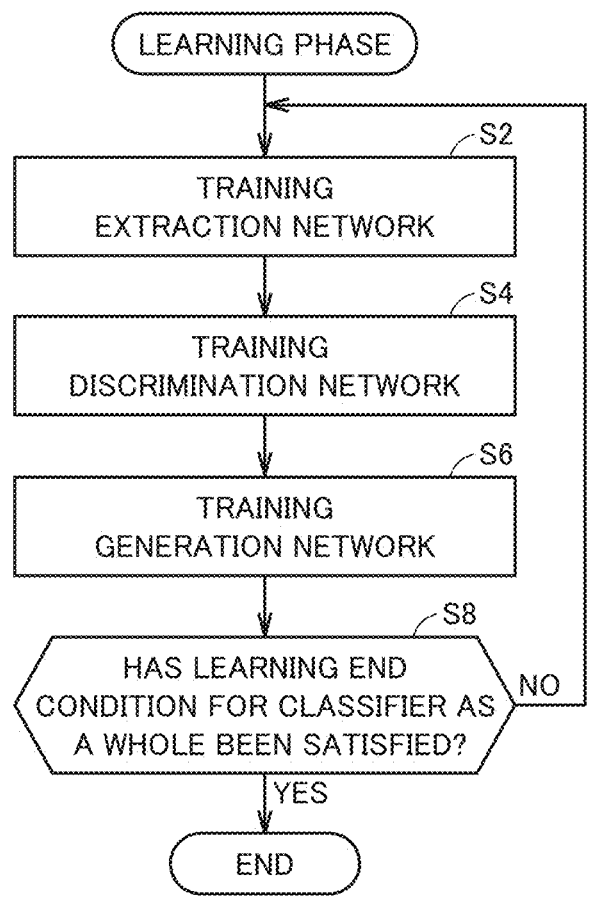
FIG. 6 is a flowchart showing one example of a procedure of training the classifier according to the present embodiment.
Figure 7:
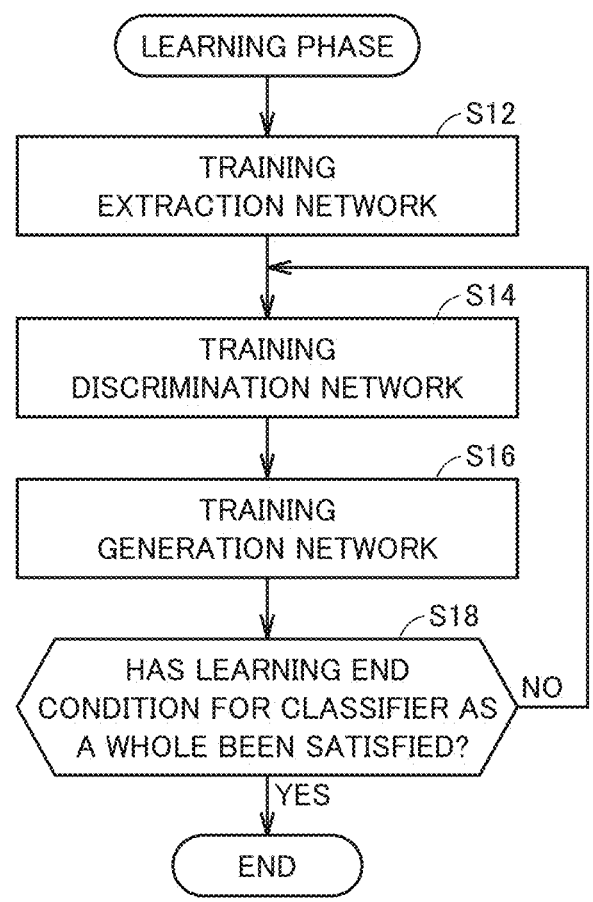
FIG. 7 is a flowchart showing another example of a procedure of training the classifier according to the present embodiment.
Figure 8:
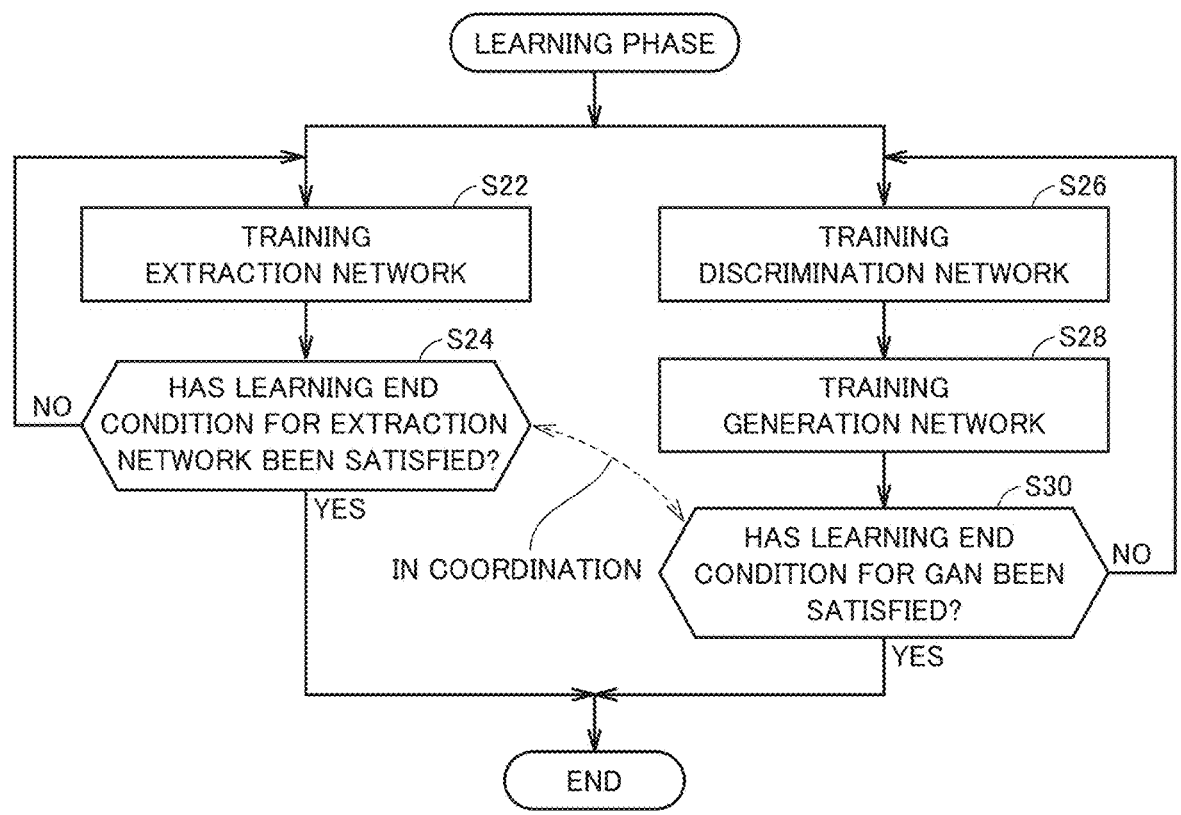
FIG. 8 is a flowchart showing yet another example of a procedure of training the classifier according to the present embodiment.

One exemplary processing procedure in the learning phase for training classifier 20 will now be described. As described above, a network parameter of three neural networks constituting classifier 20 is determined through supervised learning. FIGS. 6 to 8 are flowcharts showing exemplary procedures of training classifier 20 according to the present embodiment.

(f1: First Processing Example)

FIG. 6 shows a procedure in cyclically training generation network 30, discrimination network 40, and extraction network 50. Referring to FIG. 6, initially, training of extraction network 50 is performed (step S2). This is done because input of feature sample $x_{real}$ from extraction network 50 is necessary for training of discrimination network 40. In succession, training of discrimination network 40 is performed (step S4). This is done because an object function in training generation network 30 includes predicted value $p_D(\hat{y})$ and predicted value $p_D(\hat{S})$ of discrimination network 40. In succession, training of generation network 30 is performed (step S6).

Then, whether or not a learning end condition for classifier 20 as a whole has been satisfied is determined (step S8). The learning end condition includes, for example, a quantity of improvement in ratio of discrimination of validation data being smaller than a predetermined value.

When a learning end condition for classifier 20 as a whole has not been satisfied (NO in step S8), a next training sample is read and processing in step S2 or later is repeated. When the learning end condition could not be satisfied in spite of use of the entire training sample, training is performed by using again the first training sample.

In contrast, when a learning end condition for classifier 20 as a whole has been satisfied (YES in step S8), training of generation network 30, discrimination network 40, and extraction network 50 ends. The neural network as classifier 20 has been trained.

(f2: Second Processing Example)

FIG. 7 mainly shows a procedure in cyclically training generation network 30 and discrimination network 40 in line with a basic concept of GAN. Referring to FIG. 7, training of extraction network 50 is initially performed (step S12). In succession, training of discrimination network 40 is performed (step S14). In succession, training of generation network 30 is performed (step S16).

Then, whether or not a learning end condition for classifier 20 as a whole has been satisfied is determined (step S18). When a learning end condition for classifier 20 as a whole has not been satisfied (NO in step S18), a next training sample is read and processing in step S14 or later is repeated. When the learning end condition could not be satisfied in spite of use of the entire training sample, training is performed by using again the first training sample. Training of generation network 30 and discrimination network 40 is cyclically and repeatedly performed until the learning end condition is satisfied.

In contrast, when a learning end condition for classifier 20 as a whole has been satisfied (YES in step S18), training of generation network 30, discrimination network 40, and extraction network 50 ends. The neural network as classifier 20 has been trained.

(f3: Third Processing Example)

FIG. 8 shows a procedure in performing in parallel, training of generation network 30 and discrimination network 40 constituting GAN and training of extraction network 50 which represents an additional element.

Referring to FIG. 8, training of extraction network 50 is performed (step S22). Whether or not a learning end condition for extraction network 50 has been satisfied is then determined (step S24). When a learning end condition for extraction network 50 has not been satisfied (NO in step S24), a next training sample is read and processing in step S22 or later is repeated. When the learning end condition could not be satisfied in spite of use of the entire training sample, training is performed by using again the first training sample.

In parallel to such learning processing, training of discrimination network 40 is performed (step S26). In succession, training of generation network 30 is performed (step S28). Then, whether or not a learning end condition for GAN constituted of generation network 30 and discrimination network 40 has been satisfied is determined (step S30). When the learning end condition for GAN has not been satisfied (NO in step S30), a next training sample is read and processing in step S26 or later is repeated. When the learning end condition could not be satisfied in spite of use of the entire training sample, training is performed by using again the first training sample.

Thus, extraction network 50 as well as generation network 30 and discrimination network 40 are cyclically and repeatedly trained until each learning end condition is satisfied. Since operations may not go well when training is performed independently of each other, learning execution timing is determined in coordination with one another.

The learning procedures shown in FIGS. 6 to 8 are merely by way of example, and any learning procedure may be adopted so long as required performance can be achieved. Training of each neural network shown in FIGS. 6 to 8 may be different in number of times of training performed and in input training sample. For example, after training of discrimination network 40 N times (N being an integer not smaller than 1), training of generation network 30 may be performed only once. Thus, any method can be adopted for how to proceed with learning.

(f4: Stabilization Processing)

In the learning phase as described above, regularization processing for stabilizing learning may be performed.

For example, batch normalization (BN) has been known as a technique to stabilize learning. BN stabilizes learning by extracting batch data (mini batch) consisting of a prescribed number of samples from a group of training samples and converting each extracted mini batch such that an average of all samples is "0" and variance is "1". Since BN functions to regularize an input training sample, it can be used instead of Dropout (a technique for learning by invalidating some of nodes constituting a layer).

In the present embodiment, BN can be adopted for each layer in generation network 30 and discrimination network 40. BN is often not applied to the first layer in discrimination network 40, and Dropout rather than BN is preferably adopted for the first layer in discrimination network 40 also in the present embodiment.

In general, BN is applied after input is weighted. A technique to apply BN to input before being weighted is also available. Such a technique is referred to as pre-activation (PA). In the present embodiment, input sample $x_{raw}$ is a paragraph vector and is not standardized as it is. Therefore, standardization for each batch may be done by applying PA to input input sample $x_{raw}$ in extraction network 50.

G. Predicted Phase

One exemplary processing procedure in a predicted phase with the use of prediction engine 10 according to the present embodiment will now be described. In the predicted phase, extraction network 50 and discrimination network 40 are used.

Figure 9:
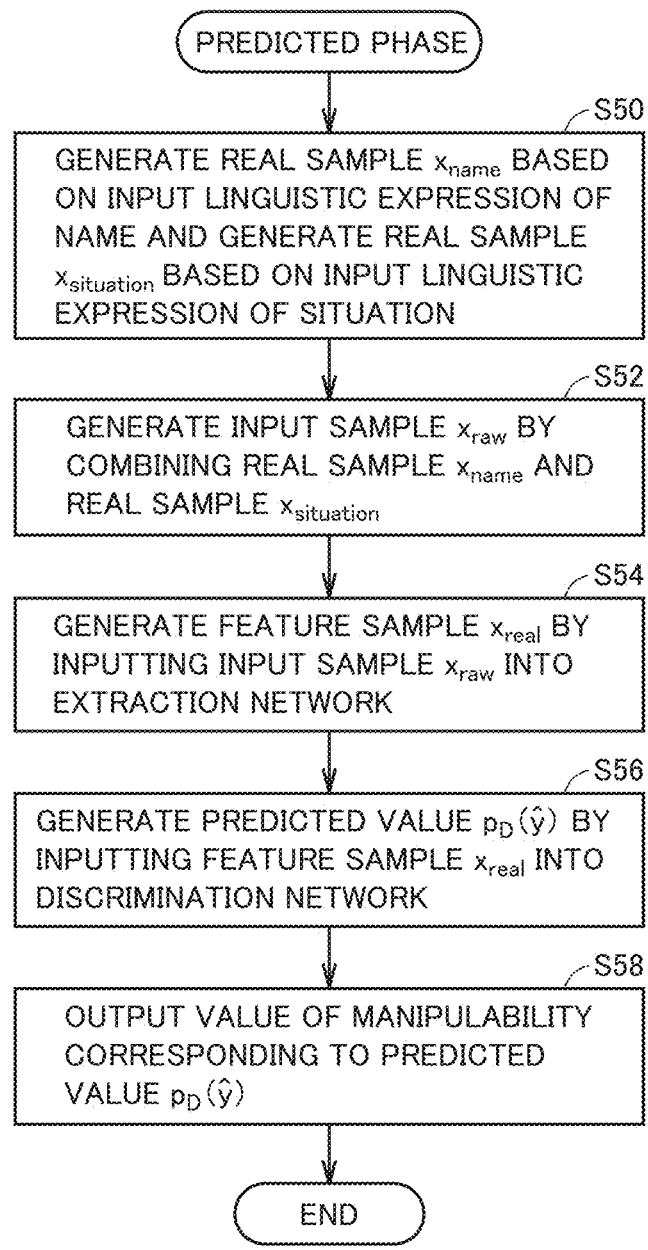
FIG. 9 is a flowchart showing a processing procedure in a predicted phase with the use of the prediction engine according to the present embodiment.

FIG. 9 is a flowchart showing a processing procedure in the predicted phase with the use of prediction engine 10 according to the present embodiment. Referring to FIG. 9, initially, a linguistic expression of a name of an object to be manipulated and a linguistic expression of a situation where an object corresponding to the name is placed in a real environment are obtained. More specifically, pre-processing engine 16 generates real sample $x_{name}$ based on the input linguistic expression of the name and pre-processing engine 18 generates real sample $x_{situation}$ based on the input linguistic expression of the situation (step S50).

In succession, the linguistic expression of the name and the linguistic expression of the situation are input to the classifier and manipulability of the object corresponding to the name in the real environment is output.

More specifically, input sample $x_{raw}$ is generated by combining real sample $x_{name}$ and real sample $x_{situation}$ (step S52). Then, generated input sample $x_{raw}$ is input to extraction network 50 to generate feature sample $x_{real}$ (step S54). Generated feature sample $x_{real}$ is input to discrimination network 40 to generate predicted value $p_D(\hat{y})$ (step S56). Finally, a value of manipulability corresponding to generated predicted value $p_D(\hat{y})$ is output (step S58).

Classification processing as above is performed each time a real sample to be classified is input.

H. Hardware Configuration of Object Manipulation System 1

Figure 10:
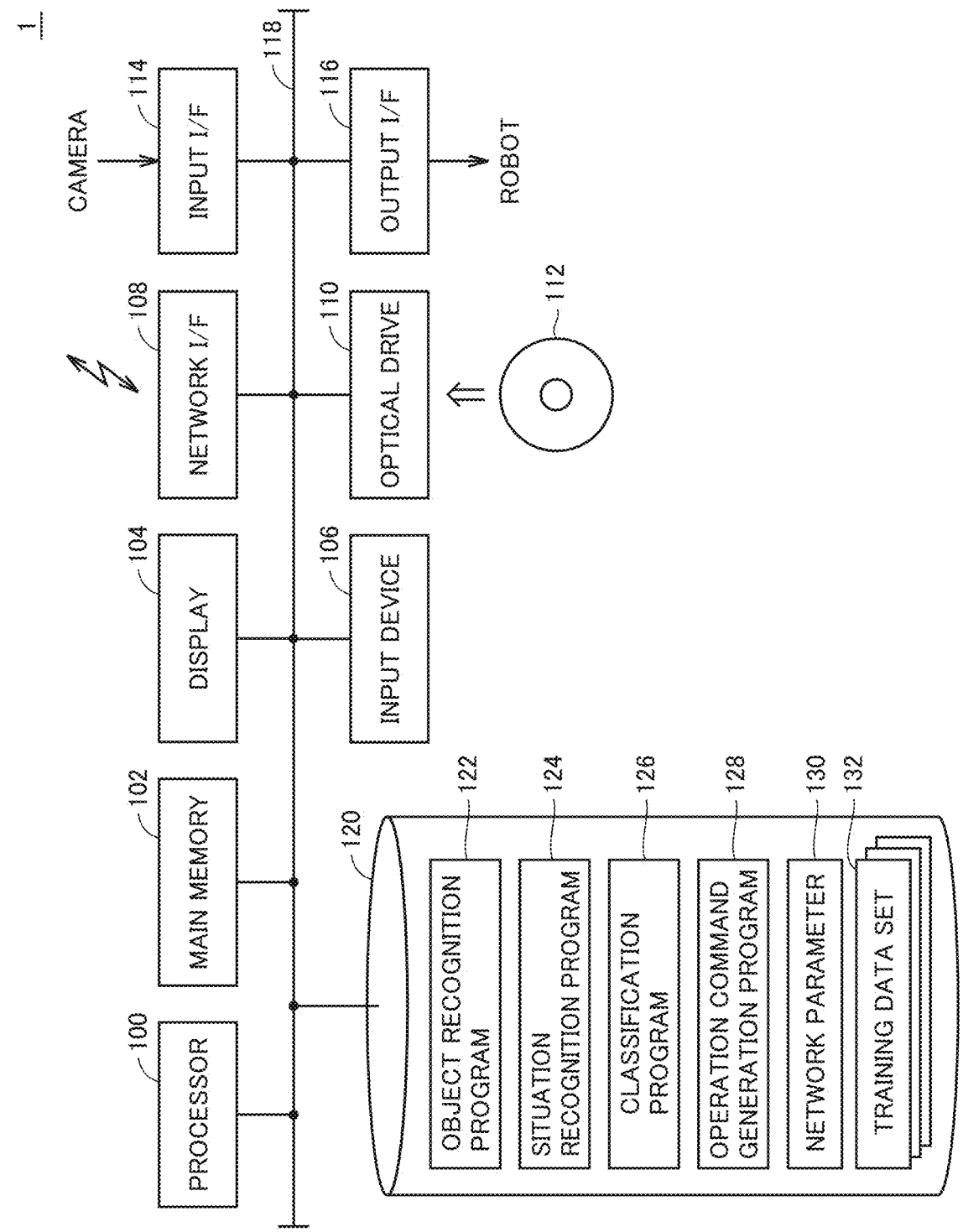
FIG. 10 is a schematic diagram showing one exemplary hardware configuration for implementing the object manipulation system according to the present embodiment.

One exemplary hardware configuration of object manipulation system 1 according to the present embodiment will now be described. FIG. 10 is a schematic diagram showing one exemplary hardware configuration for implementing object manipulation system 1 according to the present embodiment. Object manipulation system 1 is typically implemented by a general-purpose computer.

Referring to FIG. 10, object manipulation system 1 includes as main hardware components, a processor 100, a main memory 102, a display 104, an input device 106, a network interface (I/F) 108, an optical drive 110, an input interface (I/F) 114, an output interface (I/F) 116, and a secondary storage device 120. These components are connected to one another through an internal bus 118.

Processor 100 is a computation entity configured to perform processing necessary for implementing object manipulation system 1 according to the present embodiment by executing various programs as will be described alter, and is configured with at least one central processing unit (CPU) or graphics processing unit (GPU). A CPU or GPU including a plurality of cores may be employed.

Main memory 102 is a storage area where a program code or a work memory is temporarily stored in execution of a program by processor 100, and is implemented, for example, by a volatile memory device such as a dynamic random access memory (DRAM) or a static random access memory (SRAM).

Display 104 is a display device configured to output a user interface involved with processing or a result of processing, and is implemented, for example, by a liquid crystal display (LCD) or an organic electroluminescence (EL) display.

Input device 106 is a device configured to accept an instruction or a manipulation from a user and is implemented, for example, by a keyboard, a mouse, a touch panel, and/or a pen. Input device 106 may include a microphone for collecting voice and sound necessary for machine learning or an interface for connection to a sound collection device which collects voice and sound necessary for machine learning.

Network interface 108 exchanges data with any information processing apparatus on the Internet or an intranet. For example, any communication scheme such as Ethernet®, wireless local area network (LAN), or Bluetooth® can be adopted for network interface 108.

Optical drive 110 reads information stored in an optical disc 112 such as a compact disc read only memory (CD-ROM) or a digital versatile disc (DVD) and outputs the information to other components through internal bus 118. Optical disc 112 represents one example of a non-transitory recording medium and is distributed as having any program stored thereon in a non-volatile manner. A computer can provide a function of object manipulation system 1 by reading of a program from optical disc 112 by optical drive 110 and installation of the program in secondary storage device 120. Therefore, the subject matter of the present disclosure can also be a program itself installed in secondary storage device 120 or a recording medium such as optical disc 112 storing thereon a program for performing a function or processing according to the present embodiment.

Though FIG. 10 shows an optical recording medium such as optical disc 112 by way of example of a non-transitory recording medium, a semiconductor recording medium such as a flash memory, a magnetic recording medium such as a hard disk or a storage tape, or a magneto-optical recording medium such as a magneto-optical disk (MO) may be employed without being limited.

Input interface 114 is connected to an external device such as a camera and takes in a video signal resulting from image pick-up by the camera. Output interface 116 is connected to an external device such as robot 2 and outputs a necessary operation command to robot 2 based on a result of predicted manipulability and an instruction from a user. A general-purpose communication interface such as a universal serial bus (USB) can be used for input interface 114 and output interface 116.

Secondary storage device 120 is a component which stores a program to be executed by processor 100, a training data set for training of a neural network as will be described later, and a parameter defining a neural network, and is implemented, for example, by a non-volatile storage device such as a hard disk or a solid state drive (SSD).

More specifically, secondary storage device 120 stores, in addition to a not-shown operating system (OS), an object recognition program 122 for implementing object recognition engine 12, a situation recognition program 124 for implementing situation recognition engine 14, a classification program 126 for implementing classifier 20, an operation command generation program 128 for implementing robot controller 8, and a network parameter 130 for training a neural network included in object recognition engine 12, situation recognition engine 14, and classifier 20. Secondary storage device 120 may store a training data set 132.

A part of a library or a functional module required in execution of these programs in processor 100 may be substituted with a library or a functional module provided by the OS as the standard. In this case, each program alone does not include all program modules necessary for implementing corresponding functions, however, a necessary function can be realized by installation of the program in an OS execution environment. Even a program not including a part of a library or a functional module as such can be encompassed in the technical scope of the present disclosure.

These programs may be distributed not only by being stored in any recording medium as described above but also by downloading from a server apparatus through the Internet or an intranet.

Though FIG. 10 shows an example in which a single computer implements object manipulation system 1, object manipulation system 1 and the entire system including object manipulation system 1 may be implemented by a plurality of computers connected through a computer network being explicitly or implicitly in coordination, without being limited. When a plurality of computers are in coordination, some computers may be unspecified computers on a network which are what is called cloud computers.

The entirety or a part of functions implemented by execution of a program by a computer (processor 100) may be implemented by a hard-wired circuit such as an integrated circuit. For example, it may be implemented by an application specific integrated circuit (ASIC) or a field-programmable gate array (FPGA).

A person skilled in the art could implement the object manipulation system according to the present embodiment by using as appropriate technologies in accordance with the times when the present disclosure is carried out.

I. Generation of Data Set for Training

In object manipulation system 1 according to the present embodiment, a set $(x_{raw}; y)$ is necessary as a training sample. The inventors of the present application have constructed also such a data set for training. One exemplary method of constructing a multimodal data set suitable for training by object manipulation system 1 will be described below.

Initially, an approach to construct a data set necessary for training based on a standard image data set is adopted. Scalability can be enhanced by employing the standard image data set as the base.

A data set necessary for training is constructed by extracting as a standard image data set, a sub set from a "Visual Genome" data set (http://visualgenome.org) which is an existing large-scale data set and providing a label for an object manipulation task.

The "Visual Genome" data set includes at least one hundred thousand types of images and each image includes twenty-one objects on average. An area of each object is annotated by humans and given a WordNet synset (a set of synonyms) and a linguistic expression. Since a linguistic expression of each area in the image is included, it is convenient for use of a linguistic expression of a situation in an object manipulation task.

Since the "Visual Genome" data set includes also many images other than the images relating to object manipulation, an image including a synset shown below is extracted as a category relating to manipulation. For categorization (labeling), only one object to be manipulated (which is also referred to as a "trajector" below) is included in each image (sample).

apple
ball
bottle
can
cellular telephone
cup
glass
paper
remote control
shoe
teddy Though "n.01" suffixes a character representing the category described above in an actual synset, this denotation is not shown for the sake of convenience of description.

Each sample is labeled with one of seven categories below based on the reference below. Each label is exclusively given. Four categories (N), (M0), (M1), and (M2) describe respective corresponding categories of manipulability.

(E1) The area is so large that a plurality of objects in the same category as the trajector are included in that area (example: a plurality of shoes in a basket).

(E2) The area is so narrow that only a part of the trajector is included in the area (example: a handle of a glass).

(N) [Unable to hold] Though the trajector is sufficiently included in the area, it is not of interest of an object manipulation task. Namely, a synset is not sufficiently fine and a lower category which is not of interest of object manipulation is included (example: Though the area is labeled with "ball", there is actually a meat ball (in the present task, a meat ball is not of interest of object manipulation)).

(M0) [Unmanipulable] Though the trajector is sufficiently included in the area, it is unmanipulable (example: the trajector is moving, surrounded by obstacles, or is held by a human).

(M1) [Difficult to manipulate] Though the trajector is sufficiently included in the area and manipulable, a situation is such that if a robot autonomously performs an operation, the operation is highly likely to fail (the operation could be performed by remote control).

(M2) [Easy to manipulate] The trajector is sufficiently included in the area and manipulable. A situation is such that even if a robot autonomously performs an operation, the operation is less likely to fail.

(O) None of the above.

FIGS. 11A and 11B are diagrams showing examples of a constructed data set. FIGS. 11A and 11B show examples of an image in which "bottle" is given as a trajector. Each image is given a linguistic expression representing a situation as shown in the figures. For the sake of convenience of description, FIGS. 11A and 11B show only the beginning of an originally given text.

A rectangular section in FIGS. 11A and 11B represents an area of a trajector of interest.

J. Validation Experiment

The inventors of the present application conducted validation experiments with the use of a data set for training constructed in the procedure as described above. Results are shown below.

(j1: Setting)

In the present validation experiment, linguistic expressions of an instruction from a user and a situation are assumed as input. The instruction from the user (linguistic expression), however, does not include a verb but the instruction is given only as an ID indicating a specific object (a trajector). The linguistic expression of the situation is obtained from the constructed data set for training described above.

Real sample $x_{name}$ is generated from a linguistic expression of a name of the trajector and real sample $x_{situation}$ is generated from a linguistic expression of another object. Processing for conversion into a paragraph vector described above is used for generation of a real sample from each linguistic expression. Input sample $x_{raw}$ is generated by combination as below.

$$x_{raw} = \{x_{name}, x_{situation}\}$$

$x_{name}$ and $x_{situation}$ are each two-hundred dimensional paragraph vector. The number of dimensions of noise z which is to be input to generation network 30 is set to one hundred, and is sampled from the standard normal distribution.

The constructed data set for training is randomly shuffled and divided into a training set, a validation set, and a test set. In the present validation experiment, data belonging to four categories (N), (M0), (M1), and (M2) with data belonging to three categories of (E1), (E2), and (O) being excluded in advance is used and handled as a four-class classification problem. A specific size of the data set is as shown in the table below.

| | |
|---|---|
| Data Set Size (E1 to 0) | 896 |
| Vocabularies Included In Linguistic Expression of Situation | 7926 |
| Average Number of Words Included in Linguistic Expression of Situation | 305 |
| Training Set Size (N, M0, M1, M2) | 539 |
| Validation Set Size (N, M0, M1, M2) | 67 |
| Test Set Size (N, M0, M1, M2) | 67 |

Exemplary setting of each neural network with which classifier 20 is configured according to the present embodiment is shown in the table below.

| | |
|---|---|
| Optimization Method | Adam (Learning Rate 0.0005, 1 = 0:5, 2 = 0:999) |
| Input to Extraction Network | Name (200) + Situation (200) |
| The Number of Nodes in Extraction Network | 400 (in), 400, 100, 50, 100, 4 (out) |
| The Number of Nodes in Generation Network | 104 (in), 100, 100, 50 (out) |
| The Number of Nodes in Discrimination Network | 50 (in), 100, 100, 5 (out) |
| Batch Size | 50 (Extraction Network) 20 (Generation and Discrimination Networks) |
| λ | 0.2 |

(j2: Results)

By using the constructed data set, the technique according to the present embodiment and the baseline method (auxiliary classifier GAN (AC-GAN)) are compared with each other and evaluated. In general, a model parameter is updated for each epoch in comparison of accuracy of a deep neural network. Therefore, accuracy of unknown data is not represented even in comparison of a maximum value of the test set.

In the present validation experiment, in accordance with a standard procedure, a model in which accuracy of the validation set exhibits a maximum value is adopted as the best model in each technique. A table below shows results of validation of accuracy of the test set by using the best model.

| Condition | Test Set Accuracy |
|---|---|
| Baseline (AC-GAN, without PA) | 50.7% |
| Baseline (AC-GAN, with PA) | 58.2% |
| Extraction Network Alone | 61.1% |
| Present Embodiment | 67.1% |

In the table, in AC-GAN representing the baseline, the number of nodes (except for input) the same as in classifier 20 according to the present embodiment is set.

In the table, "without PA" and "with PA" represent whether or not to perform pre-activation (PA) on input.

In the table, "extraction network alone" represents accuracy of predicted value $p_E(\hat{y}_j)$ output from extraction network 50, that is, accuracy in a simple six-layered feedforward network.

As shown in the table, classifier 20 according to the present embodiment can be higher in accuracy than AC-GAN representing the baseline. This improvement in accuracy suggests that extraction of a feature closely related to classification with extraction network 50 and use of the feature alone is more advantageous than AC-GAN in which a feature value is used as it is. Such a fact suggests that, owing to generation of a sample which is a function of generation network 30, pseudo increase in number of samples input to discrimination network 40 is achieved and generalization performance is improved.

K. Form of Prediction

As described above, in consideration of general-purpose application of classifier 20 according to the present embodiment, when a neural network trained in the learning phase is applied to a plurality of systems which perform the same task, only a network parameter obtained through learning may be distributed.

Figure 12:
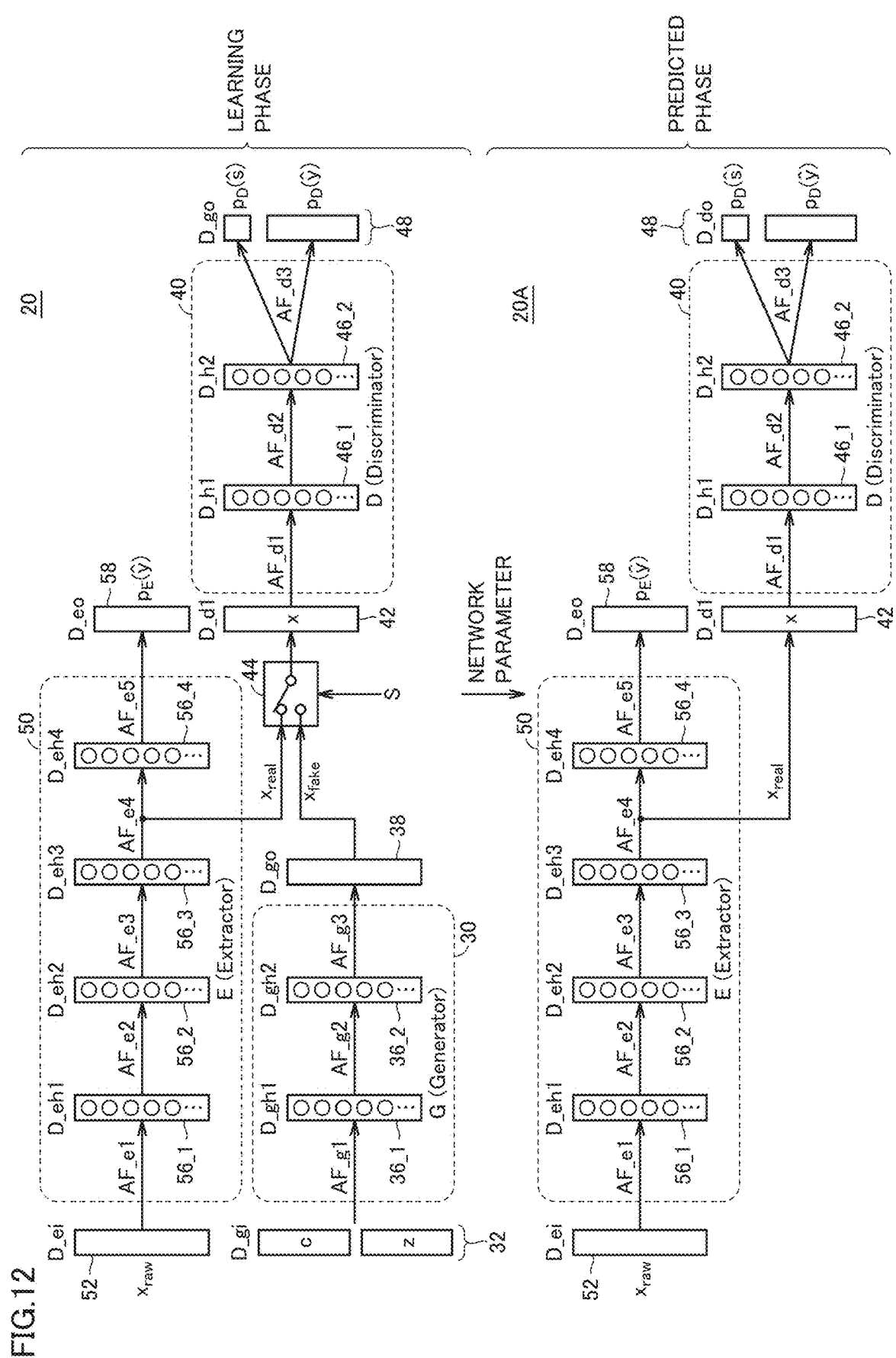
FIG. 12 is a schematic diagram showing one exemplary form of prediction by the classifier according to the present embodiment.

FIG. 12 is a schematic diagram showing one exemplary form of prediction by classifier 20 according to the present embodiment. Referring to FIG. 12, for example, classifier 20 is trained on a certain system (learning phase), and a parameter of a consequently generated network may be distributed to a system which performs an actual task (a classification task and an object manipulation task) (predicted phase). In this case, a network parameter of discrimination network 40 and extraction network 50 generated in the learning phase is distributed. By distributing the network parameter, classifier 20 which can be used in the predicted phase can be realized.

Though FIG. 12 shows a processing example suitable for what is called an on-premises environment in which a system is arranged at a location where a classification task is performed, what is called a cloud service environment in which at least one server arranged on a computer network is used to process a classification task may be adopted without being limited.

When the cloud environment is adopted, a server apparatus configured to process the classification task trains classifier 20 and classifier 20 generated through learning is used as it is. In this case, in the predicted phase, classifier 20 typically accepts input data through the computer network and provides as a response, a result of the classification task executed for the accepted input data through the computer network.

The prediction by classifier 20 described above is by way of example, and a proper implementation as appropriate can be made in accordance with a content of a requested task or an execution environment. Classifier 20 according to the present embodiment may be incorporated as a part of a larger task. In this case, a target task is executed in coordination with an apparatus or a module which executes another task.

L. Modification

Though FIG. 5 shows an exemplary network configuration in which one of feature sample $x_{real}$ and pseudo sample $x_{fake}$ is selectively input to discrimination network 40 in the learning phase, limitation thereto is not intended. For example, both of feature sample $x_{real}$ and pseudo sample $x_{fake}$ may be used.

In this case, for example, a vector resulting from combination of feature samples $x_{real}$ can be used as sample x in which input source S is associated with "real", whereas a vector resulting from combination of feature sample $x_{real}$ and pseudo sample $x_{fake}$ can be used as sample x in which input source S is associated with "fake".

M. Summary

The prediction engine according to the present embodiment outputs, upon receiving input of a linguistic expression of a name and a linguistic expression of a situation, manipulability of an object corresponding to the name in a real environment. For example, such a system that a linguistic expression of a situation is obtained in accordance with any algorithm and a linguistic expression of a name is accepted from a user can be implemented. By using such a system, even when an instruction sentence with missing information such as an instruction sentence without a verb is given, an object of interest can be specified and the specified object can be manipulated with certain confidence.

According to the conventional technology, when an instruction sentence without a verb is given, a question has to be issued again by giving confirmation utterance. According to the present embodiment, manipulation of an object can proceed without issuing again such a question.

The prediction engine according to the present embodiment adopts a classifier including a framework based on supervised cGAN (LAC-GAN). By adopting such a framework, a sample further reflecting a feature value can be input to the discrimination network and discrimination capability can be enhanced. In the learning phase, by inputting a pseudo sample from the generation network into the discrimination network, a quantity of samples to be used for learning can be increased and the possibility of overfitting can be lowered.

Though the embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. An instruction understanding system for language understanding of an instruction sentence comprising:
   at least one of (a) a processor executing a computer program and (b) hard-wired circuit(s), programmed to operate as:
   an obtaining engine configured to obtain a linguistic expression of a name of an object to be manipulated and a linguistic expression of a situation where the object corresponding to the name is placed in a real environment; and
   a classifier configured to receive input of the linguistic expression of the name and the linguistic expression of the situation and output manipulability of the object corresponding to the name in the real environment, the manipulability of the object expressed as a numerical value or category representing a likelihood that the object can be manipulated in some way,
   wherein the classifier has been trained using a set of a linguistic expression of a name of an object in an image obtained from each piece of image data included in an image data set, a linguistic expression of a situation about the object, and a label of manipulability, and
wherein the classifier includes:
an extraction network configured to generate a feature sample upon receiving input of the linguistic expression of the name and the linguistic expression of the situation, and
a discrimination network configured to output, upon receiving input of the feature sample, a first predicted value representing a category of manipulability to which the feature sample is most likely to belong and a second predicted value representing a likelihood of generation of the feature sample by the extraction network,
wherein the discrimination network is configured to receive from a generation network configured to generate a pseudo sample upon receiving input of the category and noise, input of the pseudo sample, and
wherein the discrimination network has been trained using an object function including a cost function about an error in discrimination as to whether an input sample is the feature sample or the pseudo sample and a cost function about an error in discrimination of the category to which the input sample belongs.

2. The instruction understanding system according to claim 1, wherein
the extraction network is configured to output, upon receiving the input of the linguistic expression of the name and the linguistic expression of the situation, a third predicted value representing a category of manipulability to which the input of the linguistic expression is most likely to belong.

3. The instruction understanding system according to claim 2, wherein
an output from a layer including nodes as many as a number of dimensions of the pseudo sample among layers constituting the extraction network is output as the feature sample.

4. The instruction understanding system according to claim 1, the instruction understanding system further comprising at least one of (a) a processor executing a computer program and (b) hard-wired circuit(s), programmed to operate as a pre-processing engine configured to convert the linguistic expression of the name and the linguistic expression of the situation into a vector of a fixed length which reflects proximity between words in the linguistic expressions or between whole linguistic expressions.

5. The instruction understanding system according to claim 1, wherein
the discrimination network has been trained using a cost function about an error in discrimination of the category to which the input of the linguistic expression of the name and the linguistic expression of the situation belongs.

6. The instruction understanding system according to claim 1, wherein the obtaining engine includes:
at least one of (a) a processor executing a computer program and (b) hard-wired circuit(s), programmed to operate as:
a speech recognition engine configured to recognize a spoken language instruction from a user and to output a linguistic expression of a name of an object to be manipulated, and a situation recognition engine configured to output a linguistic expression of a situation where the object to be manipulated is placed based on an image picked up by a camera.

7. The instruction understanding system according to claim 6, the instruction understanding system further comprising at least one of (a) a processor executing a computer program and (b) hard-wired circuit(s), programmed to operate as a command generation engine configured to generate an operation command to a robot based on manipulability of the object to be manipulated from the classifier, in response to the spoken language instruction from the user.

8. The instruction understanding system according to claim 1, the instruction understanding system further comprising:
at least one of (a) a processor executing a computer program and (b) hard-wired circuit(s), programmed to operate as an interactive screen generation engine configured to generate an interactive screen based on manipulability of each of objects to be manipulated included in an image picked up by a camera.

9. An instruction understanding method for language understanding of an instruction sentence, said method being practiced by at least one of (a) a processor executing a computer program and (b) hard-wired circuit(s), programmed for executing the steps of:
obtaining a linguistic expression of a name of an object to be manipulated and a linguistic expression of a situation where the object corresponding to the name is placed in a real environment; and
inputting the linguistic expression of the name and the linguistic expression of the situation into a classifier and outputting manipulability of the object corresponding to the name in the real environment, the manipulability of the object expressed as a numerical value or category representing a likelihood that the object can be manipulated in some way,
wherein the classifier has been trained using a set of a linguistic expression of a name of an object in an image obtained from each piece of image data included in an image data set, a linguistic expression of a situation about the object, and a label of manipulability, and
wherein the classifier comprises at least one of (a) a processor executing a computer program and (b) hard-wired circuit(s), programmed to operate as:
an extraction network configured to generate a feature sample upon receiving input of the linguistic expression of the name and the linguistic expression of the situation, and
a discrimination network configured to output, upon receiving input of the feature sample, a first predicted value representing a category of manipulability to which the feature sample is most likely to belong and a second predicted value representing a likelihood of generation of the feature sample by the extraction network,
wherein the discrimination network is configured to receive from a generation network configured to generate a pseudo sample upon receiving input of the category and noise, input of the pseudo sample, and
wherein the discrimination network has been trained using an object function including a cost function about an error in discrimination as to whether an input sample is the feature sample or the pseudo sample and a cost function about an error in discrimination of the category to which the input sample belongs.

10. The instruction understanding method according to claim 9,
wherein the extraction network is configured to output, upon receiving the input of the linguistic expression of the name and the linguistic expression of the situation, a third predicted value representing a category of manipulability to which the input of the linguistic expression is most likely to belong.

11. The instruction understanding method according to claim 10,
wherein an output from a layer including nodes as many as a number of dimensions of the pseudo sample among layers constituting the extraction network is output as the feature sample.

12. The instruction understanding method according to claim 9, the instruction understanding method further comprising converting the linguistic expression of the name and the linguistic expression of the situation into respective vectors of a fixed length which reflect proximity between words in the linguistic expressions or between whole linguistic expressions.

13. The instruction understanding method according to claim 9, wherein
the discrimination network has been trained using a cost function about an error in discrimination of the category to which the input of the linguistic expression of the name and the linguistic expression of the situation belongs.

14. The instruction understanding method according to claim 9, wherein
the obtaining a linguistic expression includes:
recognizing a spoken language instruction from a user and outputting a linguistic expression of a name of an object to be manipulated, and
outputting a linguistic expression of a situation where the object to be manipulated is placed based on an image picked up by a camera.

15. The instruction understanding method according to claim 14, the instruction understanding method further comprising generating an operation command to a robot based on manipulability of the object to be manipulated from the classifier, in response to the spoken language instruction from the user.

16. The instruction understanding method according to claim 9, the instruction understanding method further comprising generating an interactive screen based on manipulability of each of objects to be manipulated included in an image picked up by a camera.

17. An instruction understanding system for language understanding of an instruction sentence comprising:
at least one of (a) a processor executing a computer program and (b) hard-wired circuit(s), programmed to operate as:
an obtaining engine configured to obtain a linguistic expression of a name of an object to be manipulated and a linguistic expression of a situation where the object corresponding to the name is placed in a real environment; and
a classifier configured to receive input of the linguistic expression of the name and the linguistic expression of the situation and output manipulability of the object corresponding to the name in the real environment, the manipulability of the object expressed as a numerical value or category representing a likelihood that the object can be manipulated in some way,
wherein the classifier has been trained using a set of a linguistic expression of a name of an object in an image obtained from each piece of image data included in an image data set, a linguistic expression of a situation about the object, and a label of manipulability, and
wherein the classifier comprises
an extraction network configured to generate a feature sample upon receiving input of the linguistic expression of the name and the linguistic expression of the situation, and
a discrimination network configured to output, upon receiving input of the feature sample, a first predicted value representing a category of manipulability to which the feature sample is most likely to belong and a second predicted value representing a likelihood of generation of the feature sample by the extraction network.

* * * * *